United States Patent [19]

Schilling

[11] Patent Number: 5,667,578
[45] Date of Patent: Sep. 16, 1997

[54] ADHESION PROMOTERS FOR ANIONIC BITUMINOUS EMULSIONS

[75] Inventor: Peter Schilling, Charleston, S.C.

[73] Assignee: Westvaco Corporation, New York, N.Y.

[21] Appl. No.: 719,035

[22] Filed: Sep. 24, 1996

[51] Int. Cl.$^6$ .................................................. C09D 195/00
[52] U.S. Cl. ............................................................ 106/277
[58] Field of Search ............................................ 106/277

[56] References Cited

U.S. PATENT DOCUMENTS

| | | |
|---|---|---|
| 2,426,220 | 8/1947 | Johnson . |
| 2,679,462 | 5/1954 | Monson . |
| 2,891,872 | 6/1959 | Voet . |
| 3,006,860 | 10/1961 | Heinz . |
| 3,062,829 | 11/1962 | Wright et al. . |
| 3,108,971 | 10/1963 | Mertens . |
| 3,123,569 | 3/1964 | Borgfeldt . |
| 3,230,104 | 1/1966 | Falkenberg et al. . |
| 3,240,716 | 3/1966 | Mertens . |
| 3,245,451 | 4/1966 | Gellman . |
| 3,246,008 | 4/1966 | Evans et al. . |
| 3,344,082 | 9/1967 | Montgomery et al. . |
| 3,347,690 | 10/1967 | Galvin et al. . |
| 3,350,321 | 10/1967 | Conn . |
| 3,451,958 | 6/1969 | Riedmann et al. . |
| 3,594,201 | 7/1971 | Sommer et al. . |
| 3,615,796 | 10/1971 | Schreuders . |
| 3,615,797 | 10/1971 | Ohtsuka et al. . |
| 3,740,344 | 6/1973 | Ferm . |
| 3,766,133 | 10/1973 | Roberts et al. . |
| 3,861,933 | 1/1975 | Doi . |
| 3,868,263 | 2/1975 | McConnaughay . |
| 3,928,061 | 12/1975 | Hellsten et al. . |
| 3,941,808 | 3/1976 | Pratt . |
| 3,947,395 | 3/1976 | Ogata et al. . |
| 3,956,002 | 5/1976 | Moorer . |
| 3,963,509 | 6/1976 | Doi et al. . |
| 4,088,505 | 5/1978 | Moorer . |
| 4,293,459 | 10/1981 | Detroit . |
| 4,464,285 | 8/1984 | Schilling ........................ 252/311.5 |
| 4,464,286 | 8/1984 | Schilling ........................ 252/311.5 |
| 4,561,901 | 12/1985 | Schilling . |
| 4,639,273 | 1/1987 | Gilmore et al. . |
| 4,676,927 | 6/1987 | Schilling et al. . |
| 4,789,402 | 12/1988 | Kostusyk . |
| 4,806,166 | 2/1989 | Schilling et al. . |
| 5,194,640 | 3/1993 | Cosgrove et al. . |
| 5,208,319 | 5/1993 | Schilling . |
| 5,391,636 | 2/1995 | Schilling . |

FOREIGN PATENT DOCUMENTS 0 077 632  10/1982  European Pat. Off. .

*Primary Examiner*—David Brunsman
*Attorney, Agent, or Firm*—Daniel B. Reece, IV; Terry B. McDaniel; Richard L. Schmalz

[57] ABSTRACT

This invention relates to rapid set, medium set, and slow set anionic emulsions prepared from straight bitumen or bitumen modified by the incorporation of polymers such as styrene butadiene rubbers (SBR), styrene block copolymers (SBS), ethylene vinyl acetate copolymers (EVA), and other suitable modifiers. The invention also relates to emulsions modified by the incorporation of solvents (such as diesel oil or kerosene) or by the addition of polymer latices (such as SBR-latex or natural rubber latex). More particularly, the invention relates to improved methods for enhancing adhesion between asphalt and aggregate in anionic solventless and solvent-containing bituminous emulsions wherein the emulsifiers are alkali earth salts of tall oil fatty acids, fortified tall oil fatty acids, tall oil rosin and fortified rosin as well as combinations of kraft lignin and nonionic emulsifiers. The novel adhesion promoters utilized in these improved methods are the polyamidoamine condensation reaction products of polyalkylene polyamines with monomeric tall oil fatty acids and polymerized linoleic acids. Further improvement in adhesion can be obtained via adding paraformaldehyde to the reaction.

12 Claims, No Drawings

5,667,578

ADHESION PROMOTERS FOR ANIONIC BITUMINOUS EMULSIONS

FIELD OF INVENTION

This invention relates to rapid set, medium set, and slow set anionic emulsions prepared from straight bitumen or bitumen modified by the incorporation of polymers such as styrene butadiene rubbers (SBR), styrene block copolymers (SBS), ethylene vinyl acetate copolymers (EVA), and other suitable modifiers. The invention also relates to emulsions modified by the incorporation of solvents (such as diesel oil or kerosene) or by the addition of polymer latices (such as SBR-latex or natural rubber latex). More particularly, the invention relates to improved methods for enhancing adhesion between asphalt and aggregate in anionic solventless and solvent-containing bituminous emulsions wherein the emulsifiers are alkali earth salts of tall oil fatty acids, fortified tall oil fatty acids, tall oil rosin and fortified rosin as well as combinations of kraft lignin and nonionic emulsifiers. The novel adhesion promoters utilized in these improved methods are the polyamidoamine condensation reaction products of polyalkylene polyamines with monomeric tall oil fatty acids and polymerized linoleic acids. Further improvement in adhesion can be obtained via adding paraformaldehyde to the reaction.

BACKGROUND OF THE INVENTION

In paving operations, three main practices are employed to achieve thorough mixing of bitumen and aggregate:

(1) mixing of free flowing heated asphalt (asphalt cement) with pre-dried aggregate, (2) mixing pre-dried aggregate with asphalt diluted with a hydrocarbon solvent (cutback asphalt, cutter stock, etc.) at ambient or slightly elevated temperatures, and (3) mixing aggregate with asphalt emulsions (e.g., oil in water emulsions) obtained by vigorous agitation of asphalt and water in the presence of an emulsifying agent.

The escalating costs of energy and hydrocarbon solvents coupled with a heightened environmental awareness have stimulated increased usage of emulsified asphalts in the road paving industry. The type of emulsifier employed is determined by the desired application of the asphalt emulsion. For rapid set emulsions (mainly used for chip sealing) sodium soaps of tall oil are commonly utilized. For medium set emulsions (applied in cold mixes of virgin aggregate or reclaimed asphalt pavement) higher concentrations of tall oil or modified tall oil soaps are generally being used with and without the addition of moderate amounts of hydrocarbon solvent. Slow set emulsions with good mix stability in the presence of fine graded aggregate are usually based on vinsol (a by-product of the wood rosin manufacture), on fortified tall oil rosin in combination with kraft lignin or lignosulfonates, and combinations of kraft lignin or lignosulfonates with nonlordc emulsifiers from the class of ethoxylated alkylphenols, ethoxylated linear or branched fatty alcohols, and of ethylene oxide-propylene oxide-block co-polymers. In anionic emulsions the asphalt droplets are stabilized by anionic surfactants (wherein their negatively-charged surface migrates to the anode when an electric field is applied).

In the case of rapid set emulsions (mainly used for repair work of old wearing courses) the emulsion is applied on the existing surface and aggregate is spread on top. After the water of the emulsion has evaporated, an intimate matrix of asphalt and stone with good load bearing capacity is formed. The road can be reopened to traffic shortly after application of the seal. Medium set emulsions are commonly being mixed with aggregate in a pug mill prior to being used in road construction. The incorporation of solvent allows the mixes to be stockpiled prior to use. The mixes are prepared in central mixing plants and transported to the job sites or are generated "in-place". Slow set emulsions are being applied where good penetration and wetting is necessary. Mixes with high loadings of frees, base stabilization and tack coat are the main applications.

Anionic emulsions are taught by Mertens in U.S. Pat. No. 3,062,829 to be prepared via the use of alkali hydroxide which saponify the surface active acids naturally occurring in asphalt. These emulsions contain high molecular weight polyamides (Versene) as viscosity reducers and adhesion promoters. In U.S. Pat. No. 3,108,971 to Mertens anionic emulsions of the same type are improved with the addition of alkanolamines lacking lipophilic characteristics. Lignin amines are taught by Borgfeldt in U.S. Pat. No. 3,123,569. Quick setting emulsions obtained from highly acidic asphalts using lithium hydroxide are disclosed by Mertens in U.S. Pat. No. 3,240,716. Montgomery and Pitchford teach the alkali metal salts of complex polynuclear aromatic polycarboxylic acids as anionic emulsifiers in U.S. Pat. No. 3,344,082. Heinz in U.S. Pat. No. 3,006,860 employs alkali metal soaps of higher fatty acids such as those found in tall oil. In U.S. Pat. Nos. 3,956,002 and 4,088,505 Moorer teaches anionic emulsifiers consisting of alkali lignin or oxygenated alkali lignin, an ethylene oxide adduct of alkylphenol and up to 10% by weight of sodium borate. Detroit describes in U.S. Pat. No. 4,293,459 combinations of partially desulfonated oxygenated lignosulfonates and nonionic surfactants. Schilling et al. disclose the alkali soaps of maleated or fumarated tall oil fatty acids or rosin, of DIACID® 1550 and of sulfonated tall oil fatty acid as emulsifiers for anionic high float emulsions in U.S. Pat. No. 4,676,927 and the use of carboxyethylated modified tall oil amidoamines as emulsifiers for anionic slurry seals in U.S. Pat. No. 4,561,901. Ferm in U.S. Pat. No. 3,740,344 teaches the preparation of quick set anionic slurry seal compositions by applying a combination of aryl alkyl sulfonates and ethylene oxide adducts of alkyl phenols and of fatty alcohols. Schreuders in U.S. Pat. No. 3,615,796 teaches the use of petroleum sulfonates. A combination of sodium lignate or lignosulfonate and saponified tall oil or rosin is disclosed in U.S. Pat. No. 3,594,201 by Sommer and Evans. In U.S. Pat. No. 3,350,321 Conn describes the use of alkyl or alkoxy alkyl phosphoric acid salts as emulsifiers for asphalt.

Anionic emulsions are generally prepared at emulsifier concentrations of 0.2–10.0% based on 100% activity, preferentially at 0.2 to 2.0%. The pH range is 7 to 14, preferentially at 10 to 12 in the case of tall oil and rosin soaps. The advantage of anionic emulsions lies in the relatively low cost of tall oil based emulsifiers. The disadvantage is the low bond strength of asphalt to aggregate once the emulsion has dried and formed a film of asphalt on the surface of the aggregate. As most of the aggregates are negatively charged, the electrostatic repulsion between the negatively charged asphalt and the negatively charged stones causes inferior adhesion. Highly acidic aggregates such as quartzite, granite, rhyolite and many of the sedimentary, metamorphic and igneous rocks are considered responsible for the existing bitumen-stripping problem. This problem is also encountered in hot mix applications and when cut back asphalts are being used.

The quality of the road surface is generally dependent upon the strength of the bonds between the asphalt and the aggregate after curing of the composition. Poor service performance is due to poor adhesion, which results in asphalt stripping off the aggregate surface. Asphalt compositions also have relatively poor adhesion to aggregate in the presence of water. Since the aggregate is preferentially wetted by water, the eventual penetration of water into the composition reaches the aggregate and interferes with the bond between aggregate and asphalt. The result of this stripping is flaked pavement and the formation of pot holes.

To reduce water-induced debonding of asphalt from the stone surface, it is common in many cases to add surface-active amines or diamines to the asphalt. Generally, anti-stripping agents or adhesion promoters are introduced into the asphalt prior to the asphalt being mixed with the aggregate. In the case of anionic asphalt emulsions it is advantageous to add the additive to the emulsion to prevent degradation at the high pH values. The patent literature sets forth a large number of compounds which can be used to improve adhesion of asphalt to aggregate. These include ethylene oxide condensates of long chain alkyl triamines (U.S. Pat. No. 3,615,797), alkoxylated mines and their salts (U.S. Pat. No. 3,347,690), and reaction products of ozonized unsaturated fatty acids with polyalkylene amines (U.S. Pat. Nos. 3,246,008 and 3,245,451). Other additives are based on fatty carboxylic chromites (U.S. Pat. No. 3,963,509), on combinations of epoxy resins and onium borates (U.S. Pat. No. 3,947,395), on tall oil alkanol amines and amido amines (U.S. Pat. Nos. 2,679,462 and 4,806,166), on fatty ether amines in combination with alkanol amines (U.S. Patent No. 3,928,061), and on fatty acid amido amine soaps (U.S. Pat. Nos. 2,426,220, 2,891,872 and 3,230,104). Aminoalkyl polyalkoxysilanes are disclosed in U.S. Pat. No. 3,861,933; and condensation products of amines, polyamines, and amides with formaldehyde are taught in U.S. Pat. No. 4,639,273. Mannich reaction products of polyamines with formaldehyde and alkylphenols are described in U.S. Pat. No. 4,789,402, and ethoxylated hexamethylene-diamines and their derivatives are taught in European Patent Application No. 0 077 632 (82305420.0). Fatty primary, secondary and tertiary amines and imidazolines, their reaction products with various acids (including fatty acids), metal soaps, and several other compounds including rosin reaction products are described in U.S. Pat. No. 3,868,263.

Despite these developments, there exists a long felt need in the paving industry for relatively inexpensive adhesion promoters for use in hot mix and in cut back asphalts which are effective when employed in anionic emulsions. It is, therefore, an object of this invention to disclose an improved method for enhancing adhesion between asphalt and aggregate in anionic bituminous emulsions. A further object of this invention is to disclose improved adhesion promoters for use in bituminous emulsions.

SUMMARY OF THE INVENTION

The objectives of this invention are met by adding polyamidoamine adhesion promoters to anionic bituminous emulsions. These adhesion promoting compositions are produced by reacting a blend of monomeric tall oil fatty acid and polymerized linoleic acids in a condensation reaction with polyalkylene polyamines.

Preferred polyamidoamine adhesion promoting compositions are produced by reacting a blend of monomeric tall oil fatty acid and polymerized linoleic acids in a condensation reaction with polyalkylene polyamines and paraformaldehyde.

These products for enhancing adhesion between asphalt and aggregate are effective even when employed with traditionally recalcitrant, highly acidic aggregates. The adhesion promoting effects produced via the addition of these compositions are primarily due to their ability to migrate to the asphalt/aggregate interphase, where the compositions hydrophobize the aggregate surface and render it water repellent. In addition, these compositions also increase adhesion by neutralizing some of the negative charges introduced into the asphalt by the anionic character of the emulsifier.

DESCRIPTION OF THE PREFERRED EMBODIMENT

The polyamidoamine compositions which are effective in enhancing adhesion between asphalt and aggregate in anionic bituminous (asphalt) emulsions are reaction products formed by the condensation reaction of:

A) 50–80 percent by weight (wt. %) of a mixture comprising:
   1) 80–1 wt. % of monomeric tall oil fatty acid, and
   2) 20–99 wt. % of polymerized linoleic acid, with B) 50–20 wt. % of polyalkylene polyamine, and C) up to 10 wt. % of paraformaldehyde.

Preferred polyamidoamine compositions which are effective in enhancing adhesion between asphalt and aggregate in anionic bituminous emulsions are reaction products formed by the condensation reaction of:

A) 50–70 percent by weight (wt. %) of a mixture comprising:
   1) 60–1 wt. % of monomeric tall oil fatty acid, and
   2) 40–99 wt. % of polymerized linoleic acid, with B) 50–30 wt. % of polyalkylene polyamine, and C) up to 8 wt. % of paraformaldehyde.

Improved methods for enhancing adhesion between asphalt and aggregate in anionic bituminous emulsions may be achieved via adding these polyamidoamine compositions to the emulsions.

The term "tall oil fatty acid" refers generally to the class of products containing 90% or more fatty acids which are obtained by fractionation of crude tall oil. These fatty acids are primarily a combination of oleic and linoleic acids, with small mounts of saturated and other unsaturated fatty acids. Common impurities include rosin and neutral materials.

The various processes for producing monomeric tall oil fatty acids and for producing polymerized linoleic acids are well known to those skilled in the art. The book *Tall Oil and Its Uses II* by E. E. McSweeney et al. (published in 1987 by the Pulp Chemicals Association) is an excellent source of reference concerning these processes.

Polymerized linoleic acids which are suitable for the practice of this invention include C-36 dimer acids, higher molecular weight polycarboxylic homologues (such as C-54 trimer acids, C-72 tetramer acids, etc.), and combinations thereof. A further enhanced adhesion between asphalt and aggregate in anionic bituminous emulsions can be achieved by increasing the percentage of C-36 dimer acid and higher molecular weight polycarboxylic homologues utilized in the condensation reaction. For example, more preferred polyamidoamine adhesion promoters are the reaction products formed via the condensation reaction of:

A) 50–80 wt. % of a mixture comprising:
   1) 1–5 wt. % of monomeric tall oil fatty acid,
   2) 55–70 wt. % of C-36 dimer acid, and
   3) 25–40 wt. % of a member selected from the group consisting of C-54 trimer, higher molecular weight polycarboxylic homologues, and combinations thereof, with B) 50–20 wt. % of polyalkylene polyamine, and C) up to 10 wt. % of paraformaldehyde.

Polyalkylene polyamines which are suitable for the use in these methods have a number average molecular weight in the range of about 60 to about 500. Such polyalkylene polyamines include, but are not limited to, the following:

aminoethylethanolamine, aminoethylpiperazine, diethylenetriamine, triethylenetetramine, tetraethylenepentamine, hexaethyleneheptamine, bis-aminopropylamine, pentamethylenediamine, hydroxyethylpiperazine, bis-hexamethylenetriamine, higher molecular weight homologues, and combinations thereof.

The inclusion of paraformaldehyde in the condensation reaction has a major effect upon the molecular weights of the resulting polyamidoamine compositions. For example, where no paraformaldehyde is utilized in the condensation reaction the resulting polyamidoamine reaction product composition must have a number average molecular weight of less than 2,500 to be suitable for use in the present methods. However, if paraformaldehyde is included in the condensation reaction, then the resulting polyamidoamine reaction product compositions can have much higher number average molecular weights (and are limited only by the formation of inoperable gels).

For application purposes it is preferred to produce adhesion promoters which are liquid in form. Therefore it may be necessary to adjust the viscosities of certain formulations by the addition of a solvent (a process well within the ability of a skilled artisan). Solvents which are suitable for use in the present methods include, but are not limited to, the following: ethylene glycol, diethylene glycol, polyethylene glycol, propylene glycol, alkanolamines, and combinations thereof. Preferred alkanolamines suitable for use as a solvent include monoethanolamine, diethanolamine, triethanolamine, combinations thereof, and the like.

The utilization of certain polyamides of dilinoleic acid (polyamides manufactured by General Mills, Inc., with the trade name "VERSAMIDES") as viscosity reducers and adhesion improvers for anionic asphalt emulsions has been disclosed by Wright and Mertens in U.S. Pat. No. 3,062,829. However, it should be noted that these products were in the molecular weight range of 3,000–6,500. Furthermore, such products either a) had to be added to the molten asphalt prior to emulsification, or b) had to be adjusted to obtain an acid number of about 85 and be dissolved in alkali foregoing addition to the continuous aqueous phase prior to emulsification.

In contrast, the dimer acid-derived adhesion promoters of this invention are fully reacted dimer acid amidoamines obtained with excess polyamine based on the molecular weight and the number of carboxyl-groups in the precursor dimerized fatty acid. Their acid numbers are less than 10 and they are not soluble in alkali. Furthermore, the average molecular weight is substantially lower (less than 2,500) than that of the Versamide-polyamides. These characteristics permit the present promoters to be added to the finished emulsion before application to the aggregates, thereby allowing a much desired versatility.

The following examples are provided to further illustrate the present invention and are not to be construed as limiting the invention in any manner.

EXAMPLE 1

A polyamidoamine adhesion promoting composition was produced via the following method. A clean 2L three-necked flask, equipped with agitator, thermometer and reflux condenser with Dean-Stark trap was charged with 100 parts by weight of a polyamine blend (consisting mainly of triethylene tetramine and aminoethyl piperazine) and 100–150 parts by weight of DIMER 1500 (a polymerized linoleic acid blend, commercially available from Westvaco, Inc., consisting of dimer acid, trimer acid, and small amounts of tetramer acid). The reactants were heated at 240°–260° C. until all water of condensation was collected (3–6 hrs). The resulting polyamidoamine composition was cooled to 120° C. and discharged. (If a less viscous version of the same composition was desired, the product could be diluted at this temperature with a sufficient amount of ethylene glycol, diethylene glycol or triethanol amine.) The resulting adhesion promoter is hereafter referred to as AP#1.

EXAMPLE 2

A polyamidoamine adhesion promoting composition was produced via the following method. A clean 2L three-necked flask, equipped with agitator, thermometer and reflux condenser with Dean-Stark trap was charged with 100 parts by weight of tetraethylene pentamine and 100–150 parts by weight of DIMER 1500 (a polymerized linoleic acid blend consisting of dimer acid, trimer acid, and small amounts of tetramer acid, commercially available from Westvaco, Inc.). The reactants were heated at 240°–260° C. until all water of condensation was collected (3–6 hrs). The resulting polyamidoamine composition was cooled to 120° C. and discharged. The resulting adhesion promoter is hereafter referred to as AP#2.

EXAMPLE 3

This example illustrates the invention methods utilizing the above-noted adhesion promoters in avionic asphalt emulsions prepared with a sodium soap of tall oil (M28B) which were combined with granite aggregate from Georgia or quartzite river gravel from South Carolina. An emulsion was prepared from AMOCO EB-20 asphalt or EXXON 120/150 penetration asphalt at 65% asphalt residue using 0.8% tall oil soap (based on the weight of the emulsion) at pH 11.5. The emulsion was allowed to cool to 140° F. at which temperature the adhesion promoter (generally 0.3% based on the weight of the emulsion) was added to the emulsion and held at this temperature for at least one hour. Then, it was mixed with aggregate retained on U.S. standard sieve No. 4 or No. 8. Sufficient emulsion was used to achieve uniform coating of the aggregate. The mixes were allowed to dry two days at ambient temperature.

To determine the performance of the respective adhesion promoters the cured mixes were placed in a basket which was introduced into boiling water for ten minutes. After the basket was removed, the aggregate was spread on an absorbent paper towel and allowed to cool. The percent of retained asphalt coat on the aggregate was judged visually after placing the sample in a shallow glass pan filled with cold water and by illuminating the coated aggregate surfaces with a 60 watt lamp. The evaluation results are listed in Table I below.

TABLE I

Evaluation of Adhesion Promoters with Anionic Asphalt Emulsions with Granite and Quartzite

| Additive | Composition[1] | Asphalt[2] | Dosage %[3] | Coating[4] C | D |
|---|---|---|---|---|---|
| | CONTROL - INDULIN AS | A | 0.3 | 40 | 30 |
| AP#1 | DIMER 1500-Amine Blend (150:100) | A | 0.3 | 90 | 80 |
| | CONTROL - No Promoter | B | 0 | 5 | 0 |
| AP#1 | DIMER 1500-Amine Blend (150:100) | B | 0.3 | 95 | 95 |

TABLE I-continued

Evaluation of Adhesion Promoters with Anionic
Asphalt Emulsions with Granite and Quartzite

| Additive | Composition[1] | Asphalt[2] | Dosage %[3] | Coating[4] C | D |
|---|---|---|---|---|---|
| AP#2 | DIMER 1500-TEPA (162.5:100) | B | 0.3 | 95 | 95 |

[1]INDULIN AS: Conventional tall oil fatty acid based amidoamine commercially available from Westvaco, Inc.
DIMER 1500: Polymerized linoleic acid consisting of 60–65% dimer acid and 30–40% trimer acid), commercially available from Westvaco, Inc.
Amine Blend: Consisting mainly of triethylene tetramine and aminoethyl piperazine.
TEPA: Tetraethylene pentamine.
[2]Asphalt: (A) AMOCO EB-20 commercially available from Amoco, Inc. (65% Residue).
(B) EXXON 120/150 pen commercially available from Exxon, Inc. (65% Residue).
[3]Based on the weight of the emulsion. Tall oil (M28B) emulsifier at 0.8% with a pH of 11.5.
[4]After the coated aggregate was suspended in boiling water for 10 minutes.
Aggregate: (C) Granite (retained on No.4 sieve).
(D) Quartzite river gravel (retained on No.4 sieve).

The results noted in Table 1 above clearly show the increased efficiency of the methods utilizing the novel adhesion promoters disclosed herein, especially when compared to conventional adhesion promoters.

EXAMPLE 4

Using the evaluation procedures described in Example 3 above, a series of tests were conducted to show the efficiency of the adhesion promoters of this invention prepared from Dimer 1500 in anionic slow-set emulsions prepared with INDULIN SAL (a tall oil fatty acid based amidoamine commercially available from Westvaco, Inc.). The emulsions were prepared using both AC-20 asphalt (obtained from New Mexico) and AMOCO EB-20 asphalt at 60% residues and at pHs of 11.5. The emulsifier concentrations were 3%. The results are shown in Table II below.

TABLE II

Evaluation of Adhesion Promoters with Anionic
Slow-Set Asphalt Emulsion and Granite or Quartzite

| Additive | Composition[1] | Asphalt[2] | Dosage %[3] | Coating %[4] C | D |
|---|---|---|---|---|---|
| — | CONTROL - No Promoter | A | 0 | 5 | 5 |
| AP#1 | DIMER 1500-Amine Blend (150:100) | A | 0.3 | 50 | 50 |
| — | CONTROL - No Promoter | B | 0 | 0 | 0 |
| AP#1 | Dimer 1500-Amine Blend (150:100) | B | 0.3 | 65 | 40 |

[1]DIMER 1500: Polymerized linoleic acid consisting of 60–65% dimer acid and 30–40% trimer acid, commercially available from Westvaco, Inc.
Amine Blend: Consisting mainly of triethylene tetramine and aminoethyl piperazine.
[2]Asphalt: (A) AC-20 from New Mexico (60% Residue).
(B) AMOCO EB-20 commercially available from AMOCO Inc. (60% Residue).
[3]Based on the weight of the emulsion. Tall oil (M28B) emulsifier at 0.8% with a pH of 11.5. INDULIN SAL emulsifier (a conventional tall oil fatty acid based amidoamine commercially available from Westvaco, Inc.) at 3.0% with a pH of 11.5.
[4]After the coated aggregate was suspended in boiling water for 10 minutes.
Aggregate: (C) Granite (retained on No.4 sieve).
(D) Quartzite river gravel (retained on No.4 sieve).

The results noted in Table II clearly show the efficiency of the methods employing the novel adhesion promoters disclosed herein. While anionic slow-set emulsions prepared with INDULIN SAL show generally very good mix-stability with highly reactive aggregates such as granite or quartzite. However, it is very difficult to retain the asphalt coating on the aggregate when the dried mixes are submitted to the boiling water test.

EXAMPLE 5

A polyamidoamine adhesion promoter was produced via the following method. A clean 2L three-necked flask equipped with agitator, thermometer and reflux condenser with Dean-Stark trap was charged with 100 parts of a polyamine blend mainly consisting of triethylene tetramine and aminoethyl piperazine and 150 parts by weight of DTC-195 (a blend containing about 5% tall oil fatty acid and about 95% dimer/trimer acid which is commercially available from Westvaco, Inc). The reaction mixture is heated to 240°–260° C. and kept at this temperature until all the water of condensation has been collected (2–4 hrs). The product was cooled to 120° C. and discharged. The resulting adhesion promoter is hereafter referred to as AP#3.

EXAMPLE 6

A polyamidoamine adhesion promoter was produced via the following method. A clean 2L three-necked flask equipped with agitator, thermometer and reflux condenser with Dean-Stark trap was charged with 100 parts of a polyamine blend mainly consisting of triethylene tetramine and aminoethyl piperazine and 125 parts by weight of DTC-155 (a blend containing about 50% tall oil fatty acid and about 50% dimer/trimer acid which is commercially available from Westvaco, Inc). The reaction mixture is heated to 240°–260 ° C. and kept at this temperature until all the water of condensation has been collected (2–4 hrs). The product was cooled to 120° C. and discharged. The resulting adhesion promoter is hereafter referred to as AP#4.

EXAMPLE 7

A polyamidoamine adhesion promoter was produced via the following method. A clean 2L three-necked flask equipped with agitator, thermometer and reflux condenser with Dean-Stark trap was charged with 100 parts of a polyamine blend mainly consisting of triethylene tetramine and aminoethyl piperazine, 150 parts by weight of DTC-155 (a blend containing about 50% tall oil fatty acid and about 50% dimer/trimer acid which is commercially available from Westvaco, Inc), and 15 parts of paraformaldehyde. The reaction mixture is heated to 240°–260 ° C. and kept at this temperature until all the water of condensation has been collected (2–4 hrs). The product was cooled to 120° C. and discharged. The resulting adhesion promoter is hereafter referred to as AP#5.

EXAMPLE 8

A polyamidoamine adhesion promoter was produced via the following method. A clean 2L three-necked flask equipped with agitator, thermometer and reflux condenser with Dean-Stark trap was charged with 100 parts of a polyamine blend mainly consisting of triethylene tetramine and aminoethyl piperazine, 150 parts by weight of DTC-155 (a blend containing about 50% tall oil fatty acid and about 50% dimer/trimer acid which is commercially available from Westvaco, Inc), and 10 parts of paraformaldehyde. The reaction mixture is heated to 240°–260° C. and kept at this temperature until all the water of condensation has been collected (2–4 hrs). The product was cooled to 120° C. and discharged. The resulting adhesion promoter is hereafter referred to as AP#6.

EXAMPLE 9

A polyamidoamine adhesion promoter was produced via the following method. A clean 2L three-necked flask equipped with agitator, thermometer and reflux condenser with Dean-Stark trap was charged with 100 parts of a polyamine blend mainly consisting of triethylene tetramine and aminoethyl piperazine, 50 parts of L-5 (a tall oil fatty acid blend which is commercially available from Westvaco, Inc.), 150 parts by weight of DTC-155 (a blend containing about 50% tall oil fatty acid and about 50% dimer/trimer acid which is commercially available from Westvaco, Inc), and 10 parts of paraformaldehyde. The reaction mixture is heated to 240°–260° C. and kept at this temperature until all the water of condensation has been collected (2–4 hrs). The product was cooled to 120° C. and discharged. The resulting adhesion promoter is hereafter referred to as AP#7.

EXAMPLE 10

Using the evaluation procedures described in Example 3 above, a series of tests were conducted to show the improved performance of the adhesion promoters of this invention evaluated in an emulsion prepared from Exxon 120/150 penetration asphalt in combination with granite and quartzite river gravel. The evaluation results are summarized in Table III below.

TABLE III

Evaluation of Adhesion Promoters in Anionic Asphalt Emulsions in Combination with Granite and Quartzite

| Additive | Composition[1] | Dosage %[2] | Coating %[3] A | B |
|---|---|---|---|---|
| — | CONTROL - No Promoters | 0 | 15 | 5 |
| AP#3 | DTC 195-Amine Blend (150:100) | 0.3 | 85 | 50 |
| AP#4 | DTC 155-Amine Blend (125:100) | 0.3 | 85 | 55 |
| AP#5 | DTC-155-Amine Blend-PFA (150:100:15) | 0.3 | 90 | 70 |
| AP#6 | DTC-155-Amine Blend-PFA (150:100:10) | 0.3 | 85 | 80 |
| AP#7 | DTC-155-L-5-Amine Blend-PFA (100:50:100:10) | 0.3 | 90 | 80 |

[1]DTC-195: A blend of about 5% tall oil fatty acid and about 95% dimer/trimer acid commercially available from Westvaco, Inc
DTC-155: A blend of about 50% tall oil fatty acid and about 50% dimer/trimer acid commercially available from Westvaco, Inc
Amine Blend: Consisting mainly of triethylene tetramine and aminoethyl piperazine.
L-5: A tall oil fatty acid blend commercially available from Westvaco, Inc.
PFA: Paraformaldehyde.
[2]Based on the weight of the emulsion. Tall oil (M28B) emulsifier at 0.8% with a pH of 11.5.
[3]After the coated aggregate was suspended in boiling water for 10 minutes. Aggregate: (A) Granite (retained on No.4 sieve).
(B) Quartzite river gravel (retained on No.4 sieve).

The results noted in Table III clearly show the efficiency of the methods utilizing the novel adhesion promoters disclosed herein. Attention should be paid to the improved performance of the amidoamines prepared in the presence of paraformaldehyde (which renders these preferred promoters extremely effective when the emulsions are combined with the difficult quartzite river gravel).

It is clear that the novel adhesion promoter compositions taught herein achieved superior results when compared to conventional adhesion promoters used for asphalt aggregate compositions. Many modifications and variations of the present invention will be apparent to one skilled in the art in light of the above teaching. It is understood therefore that the scope of the invention is not to be limited by the foregoing description, but rather is to be defined by the claims appended hereto.

What is claimed is:

1. An improved method for enhancing adhesion between asphalt and aggregate in anionic bituminous emulsions wherein the improvement comprises the addition to the emulsion of a composition comprising the polyamidoamine condensation reaction products of:
   (A) 50–80 wt. % of a mixture comprising:
      1) 80–1 wt. % of monomeric tall oil fatty acid, and
      2) 20–99 wt. % of polymerized linoleic acid, with
   (B) 50–20 wt. % of polyalkylene polyamine, and
   (C) up to 10 wt. % of paraformaldehyde.

2. The method of claim 1 wherein the composition comprises the polyamidoamine condensation reaction products of:
   (A) 50–70 wt. % of a mixture comprising:
      1) 60–1 wt. % of monomeric tall oil fatty acid, and
      2) 40–99 wt. % of polymerized linoleic acid, with
   (B) 50–30 wt. % of polyalkylene polyamine, and
   (C) up to 8 wt. % of paraformaldehyde.

3. The method of claim 1 wherein the composition comprises the polyamidoamine condensation reaction products of:
   (A) 50–80 wt. % of a mixture comprising:
      1) 1–5 wt. % of monomeric tall oil fatty acid,
      2) 55–70 wt. % of C-36 dimer acid, and
      3) 25–40 wt. % of a member selected from the group consisting of C-54 trimer, higher molecular weight polycarboxylic homologues, and combinations thereof, with
   (B) 50–20 wt. % of polyalkylene polyamine, and
   (C) up to 10 wt. % of paraformaldehyde.

4. The method of claim 1 wherein the polymerized linoleic acid is a member selected from the group consisting of C-36 dimer acids, C-54 trimer acids, C-72 tetramer acids, higher molecular weight polycarboxylic homologues, and combinations thereof.

5. The method of claim 1 wherein the polyalkylene polyamine is a member selected from the group consisting of aminoethylethanolamine, aminoethylpiperazine, diethylenediamine, triethylenetetramine, tetraethylenepentamine, hexaethyleneheptamine, bis-aminopropylamine, pentamethylenediamine, hydroxyethylpiperazine, bis-hexamethylenetriamine, higher molecular weight homologues, and combinations thereof.

6. The method of claim 1 wherein the polyalkylene polyamine has a number average molecular weight in the range of about 60 to about 500.

7. The method of claim 1 wherein the composition is dispersed in a solvent selected from the group consisting of ethylene glycol, diethylene glycol, polyethylene glycol, propylene glycol, alkanolamines, and combinations thereof.

8. The method of claim 7 wherein the alkanolamine is a member selected from the group consisting of monoethanolamine, diethanolamine, triethanolamine, and combinations thereof.

9. The composition of claim 1.

10. The method of claim 1 wherein no paraformaldehyde is included in the condensation reaction.

11. The composition of claim 10.

12. The composition of claim 11 wherein the composition has a number average molecular weight below 2,500.

* * * * *

UNITED STATES PATENT AND TRADEMARK OFFICE
CERTIFICATE OF CORRECTION

PATENT NO. : 5,667,578
DATED : September 16, 1997
INVENTOR(S) : Peter Schilling

It is certified that error appears in the above-indentified patent and that said Letters Patent is hereby corrected as shown below:

In column 1, line 55, delete "nonlordc" and substitute therefor --nonionic--.

In column 2, line 7, delete "frees" and substitute therefor --fines--.

In column 6, line 28, delete "avionic" and substitute therefor --anionic--.

In column 7, Table I, line 7, add "%" before $^4$.

In column 10, line 44, delete "diethylenediamine" and substitute therefor --diethylenetriamine--.

Signed and Sealed this

Eighteenth Day of November 1997

Attest:

BRUCE LEHMAN

*Attesting Officer*  *Commissioner of Patents and Trademarks*